United States Patent
Shoge (10) Patent No.: US 8,958,935 B2
(45) Date of Patent: Feb. 17, 2015

(54) BICYCLE DRIVE APPARATUS

(75) Inventor: Akihiko Shoge, Osaka (JP)

(73) Assignee: Shimano Inc., Osaka (JP)

( * ) Notice: Subject to any disclaimer, the term of this patent is extended or adjusted under 35 U.S.C. 154(b) by 164 days.

(21) Appl. No.: 13/594,556

(22) Filed: Aug. 24, 2012

(65) Prior Publication Data

US 2013/0054068 A1    Feb. 28, 2013

(30) Foreign Application Priority Data

Aug. 29, 2011 (JP) ................................ 2011-186597

(51) Int. Cl.
*B62M 6/45* (2010.01)
*B62M 6/55* (2010.01)
*B62M 9/122* (2010.01)
*B62M 9/132* (2010.01)

(52) U.S. Cl.
CPC . *B62M 6/45* (2013.01); *B62M 6/55* (2013.01); *B62M 9/132* (2013.01); *B62M 9/122* (2013.01)
USPC .................................. 701/22; 701/52; 701/61

(58) Field of Classification Search
CPC .......... B62M 9/122; B62M 6/55; B62M 6/50; B62M 6/60; B62M 6/90; B62M 9/132
USPC ................. 701/22, 36, 52, 53, 61; 180/206.1, 180/206.2, 206.4, 206.5, 206.7, 218, 220
See application file for complete search history.

(56) References Cited

U.S. PATENT DOCUMENTS

| | | | |
|---|---|---|---|
| 6,629,574 B2 * | 10/2003 | Turner | 180/206.4 |
| 7,706,935 B2 * | 4/2010 | Dube et al. | 701/22 |
| 2002/0014366 A1 * | 2/2002 | Turner | 180/220 |
| 2004/0035233 A1 * | 2/2004 | Takeda | 74/336 R |
| 2004/0206188 A1 * | 10/2004 | Takamoto et al. | 73/781 |
| 2005/0075774 A1 * | 4/2005 | Takamoto et al. | 701/51 |
| 2012/0012412 A1 * | 1/2012 | Moeller et al. | 180/206.2 |

FOREIGN PATENT DOCUMENTS

| | | |
|---|---|---|
| CN | 1689905 A | 11/2005 |
| CN | 201849627 U | 6/2011 |
| EP | 2218635 A1 | 8/2010 |
| JP | 9-58569 A | 3/1997 |
| JP | 2004-243920 A | 9/2004 |

\* cited by examiner

*Primary Examiner* — Jason Holloway
(74) *Attorney, Agent, or Firm* — Global IP Counselors (57) ABSTRACT

A bicycle drive apparatus includes a bicycle transmission, a drive assistance electric motor and a microcomputer. The microcomputer includes an output control section that controls an output of the drive assistance electric motor, and that issues a motor output increasing command to increase the output of the drive assistance electric motor upon receiving a shift command for shifting the transmission.

12 Claims, 5 Drawing Sheets

BICYCLE DRIVE APPARATUS

CROSS-REFERENCE TO RELATED APPLICATIONS

This application claims priority under 35 U.S.C. §119 to Japanese Patent Application No. 2011-186597, filed Aug. 29, 2011. The entire disclosure of Japanese Patent Application No. 2011-186597 is hereby incorporated herein by reference.

BACKGROUND

1. Field of the Invention

This invention generally relates to a bicycle control apparatus. More specifically, the present invention relates to a bicycle control apparatus that controls a bicycle having an electric motor for riding assistance and a transmission.

2. Background Information

Recently, electrically assisted bicycles that assist riding by supplementing a rider's pedaling force with a motor drive force are becoming more popular. Japanese Laid-Open Patent Application Publication No. 9-58569 discloses a technology in which an electrically assisted bicycle is equipped with a transmission. With this bicycle, a force imparted by a rider to a pedal is transmitted through a chain to a transmission provided on a rear wheel axle. After being multiplied by a gear ratio of the transmission, the force is transmitted to the rear wheel. In this bicycle, the motor drive force is also transmitted to the rear wheel

SUMMARY

The bicycle presented in Japanese Laid-Open Patent Application Publication No. 9-58569 has an internal transmission provided on the axle of the rear wheel. Generally, with this kind of transmission, it is preferable for a torque not to be acting on the gears and other internal parts during a gear change operation. If a gear change operation is executed while the parts of the transmission are transmitting a large torque, then there will be a possibility that the gear change operation will not proceed smoothly. In other transmissions, too, there is a possibility that a gear change operation will not proceeds smoothly if the gear change operation is executed while an excessive force is acting on the transmission.

The object of the present invention is to enable a smooth gear change operation in a bicycle configured to provide drive assistance using an electric motor.

In accordance with a first aspect, a bicycle drive apparatus is provided that basically comprises a bicycle transmission, a drive assistance electric motor and a microcomputer. The microcomputer includes an output control section that controls an output of the drive assistance electric motor, and that issues a motor output increasing command to increase the output of the drive assistance electric motor upon receiving a shift command for shifting the transmission.

With this bicycle drive apparatus, the depression force exerted against the pedal decreases when the transmission executes the gear change operation because the output of the drive assistance electric motor increases after the shift command is issued. That is, the control apparatus according to the present invention decreases the depression force exerted against the chain by a rider during a gear change operation and achieves a smooth gear change operation.

In accordance with a second aspect, the bicycle drive apparatus according to the first aspect is provided such that the microcomputer further includes a gear shift control section that issues the shift command to operate the drive assistance electric motor based on the shift command, and the output control section places the output of the drive assistance electric motor into an increased output state as a gear change operation starts the transmission. With this bicycle drive apparatus, since the output of the drive assistance electric motor is in an increased state when the gear change operation starts, the pedaling force acting on the chain is already small when the gear change operation is executed and the gear change operation can be ensured to be smooth.

In accordance with a third aspect, the bicycle drive apparatus according to the first aspect or the second aspect is provided further comprises a gear shifter unit operatively coupled to the microcomputer, which further includes a gear shift control section that issues the shift command either in response to manual operation of the gear shifter unit or in response to an automatic shift signal. With this bicycle drive apparatus, the bicycle drive apparatus can be employed both when the shift command is issued to the output control section in response to a manual operation performed by a person and when the shift command is issued to the output control section from the gear shift control section automatically based on a traveling speed or other information. In either case, the output of the drive assistance electric motor increases when the shift command is issued to the output control section and a smooth gear change operation is accomplished.

In accordance with a fourth aspect, the bicycle drive apparatus according to the first aspect or the second aspect is provided such that the bicycle transmission further includes a gear, shift motor, and the microcomputer further includes a gear shift control section that issues the shift command to operate the drive assistance electric motor based on the shift command, and that operates the gear shift motor of the transmission after the output control section has increased the output of the drive assistance electric motor. With this bicycle drive apparatus, the electric gear shift motor of the transmission starts operating at a timing occurring after the output of the drive assistance electric motor has increased. As a result, the output of the drive assistance electric motor is in an increased state when the gear change operation starts and the gear change operation is ensured to be smooth.

In accordance with a fifth aspect, the bicycle drive apparatus according to any one of the first to fourth aspects is provided such that the transmission is an internal transmission. The internal transmission is a transmission that uses gear wheels. Depending on the position where the internal transmission is installed, it may be called a rear wheel hub transmission or a crank axle transmission. With this internal transmission, although gear change operations are generally smoother when the transmitted torque is smaller than when the transmitted torque is larger, a smooth gear change operation can be accomplished with the present invention because the torque imposed on the transmission is smaller during the gear change operation.

In accordance with a sixth aspect, the bicycle drive apparatus according to any one of the first to fourth aspects is provided such that the transmission is an external transmission. An external transmission is a transmission in which gear changing is accomplished by moving the chain between sprockets using a derailleur. A front derailleur that moves the chain between sprockets of the crank axle and/or a rear derailleur that moves the chain between sprockets of the rear wheel are operated with a wire (cable) extending from a shifter or an electric motor in order to change gears. With this external transmission, a gear change operation is not adversely affected when some degree of tension exists in the chain, but gear changing is difficult when an excessive amount of tension exists in the chain. However, with the present invention, the gear change operation is smooth because an excessive tension force is prevented from developing in the chain during the gear change operation.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
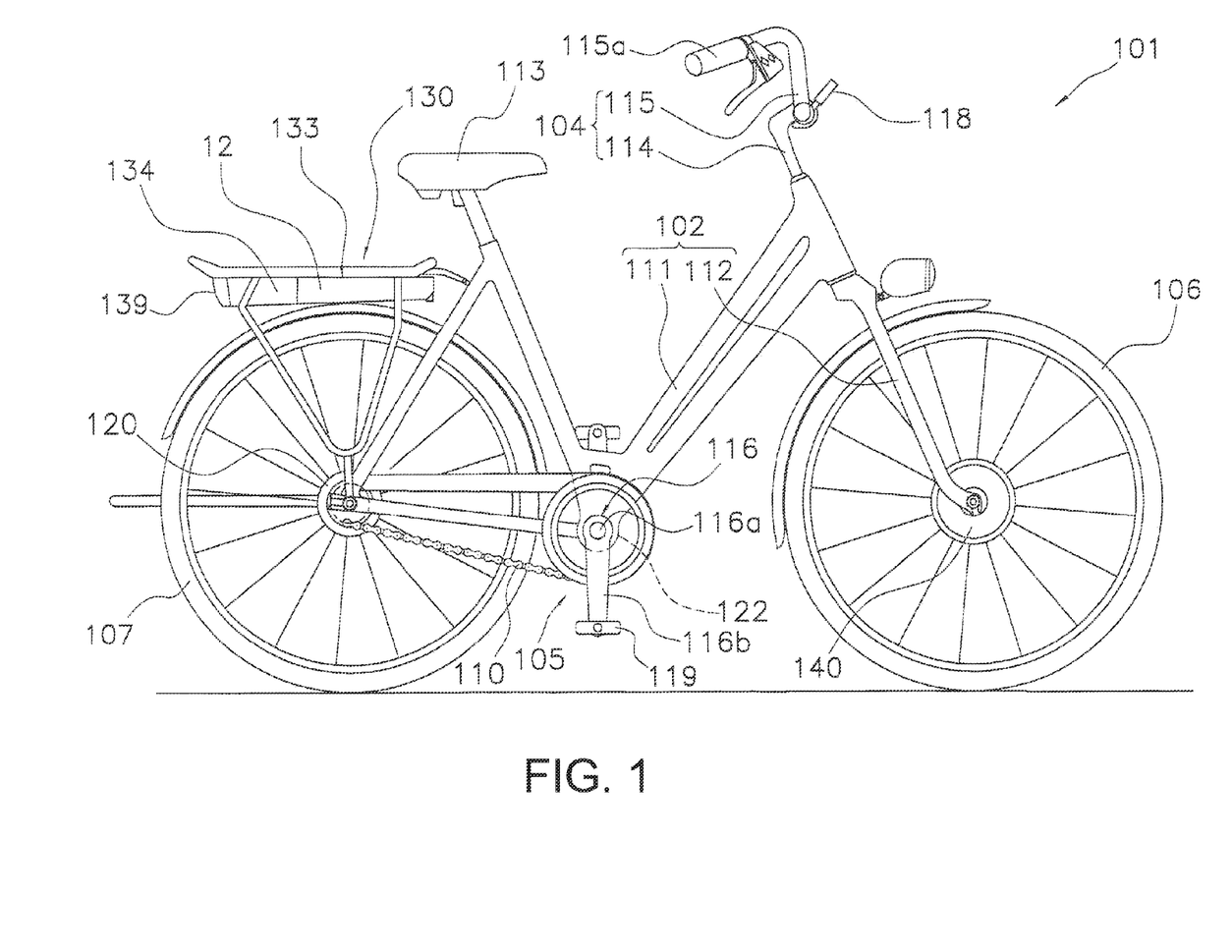
FIG. 1 is a side elevational view of a bicycle that is equipped with a bicycle drive apparatus in accordance with one embodiment.

FIG. 1 shows a bicycle 101 that employs a bicycle control apparatus according to an embodiment of the present invention. The bicycle 101 comprises chiefly a frame 102, a handlebar unit 104, a display device 118, a front wheel 106, a rear wheel 107, a chain 110, a crankset 116 an internal transmission 120, a rear carrier 130, a rechargeable battery 134, an assistance motor unit 140, a microcomputer 12 constituting a bicycle control apparatus, and a front brake device and a rear brake device that are not shown in the drawings.

The frame 102 has a frame body 111 and a front fork 112. The front fork 112 is attached to a frontward portion of the frame body 111 such that it can pivot about a slanted axis. A saddle 113, the handlebar unit 104, and other components are attached to frame 102.

The crankset 116 comprises a crank axle 116a that extends in a horizontal direction and a left-right pair of crank arms 116b that are provided on axially opposite ends of the crank axle 116a and arranged 180 degrees out of phase from each other. The crank axle 116a is supported rotatably in a hanger section 122 of the frame 111. Pedals 119 are attached to the tip ends of the crank arms 116b. The chain 110 is arranged on a front sprocket fixed to the crank axle 116a and a rear sprocket provided on an internally geared hub 121 of the internal transmission 120 (explained later).

Figure 3:
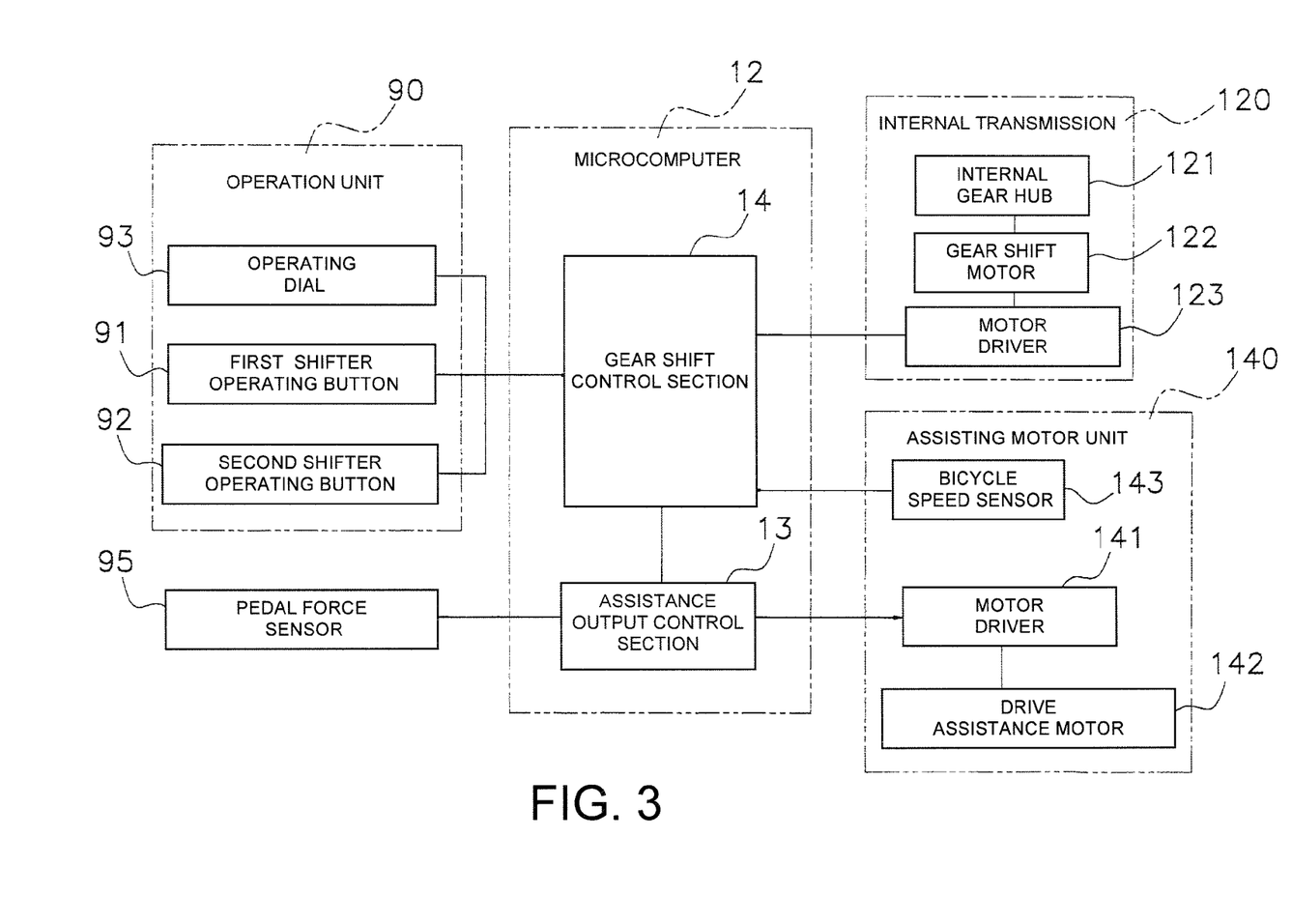
FIG. 3 is a block diagram of a bicycle control apparatus.

As shown in FIG. 3, the internal transmission 120 comprises an internally geared hub 121, an electric gear shift motor 122, and a motor driver 123. The internally geared hub is arranged in a center portion of the rear wheel 107 and configured to be driven by the chain 110. The internally geared hub 121 is an eight-speed hub. The internally geared hub 121 is a gear changing mechanism that includes a planetary gear mechanism. The internally geared hub 121 is connected to the gear shift motor 122, which serves to drive the gear changing mechanism using electric power. The motor driver 123 receives a signal from a gear shift control section 14 (explained later) and drives the gear shift motor 122. The internally geared hub 121 is connected to the rear brake device.

The handlebar unit 104 has a handlebar stem 114 fixed to an upper portion of the front fork 112 and a handlebar 115 that is fixed to the handlebar stem 114. Brake levers and grips 115a are attached to both ends of the handlebar 115.

Figure 2:
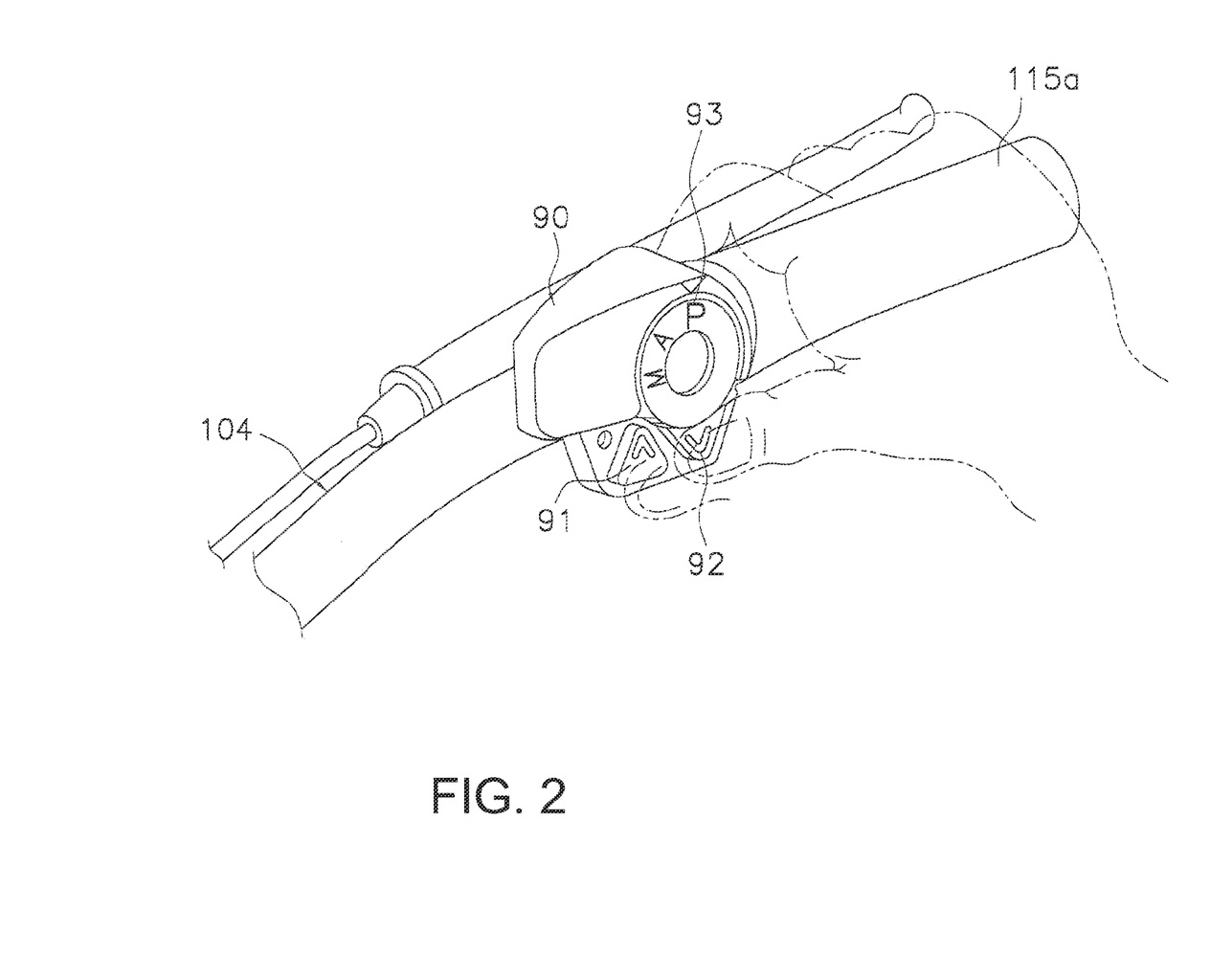
FIG. 2 shows a gear shifter unit attached to a handlebar unit.

As shown in FIG. 2, a gear shifter unit 90 is attached to the handlebar unit 104 near a grip 115a. The gear shifter unit 90 is a single unit integrating a first shifter operating button 91, a second shifter operating button 92, and an operating dial 93. As shown in FIG. 2, the first and second shifter operating buttons 91 and 92 and the operating dial 93 are positioned such that a person can operate them with a finger while gripping the grip 115a. The first and second shifter operating buttons 91 and 92 are pushbuttons. The first shifter operating button 91 is on the left side and serves as a button for shifting from a lower gear to a higher gear. The second shifter operating button 92 is on the right side and serves as a button for shifting from a higher gear to a lower gear. The operating dial 93 is a dial for switching between two shifting modes and a parking (P) mode and has three stop positions: P, A and M. The two shifting modes are an automatic shifting mode (A) and a manual shifting mode (M). The automatic shifting mode is a mode in which the internally geared hub 121 of the internal transmission 120 is shifted automatically based on a bicycle speed signal from a bicycle speed sensor 143 (explained later). The manual shifting mode is a mode in which the internally geared hub 121 is shifted to any desired gear by operating the first and second shifter operating buttons 91 and 92. The parking mode is a mode in which rotation of the rear wheel 107 is restricted by locking the internally geared hub 121.

A display device 118 is fixed to a middle portion of the handlebar 115 such that it straddles the handlebar stem 114. The display device 118 has a liquid crystal display screen and serves to display such information as the shift mode, the speed of the bicycle, the gear position, the distance traveled, and the remaining capacity of the rechargeable battery 134.

A rear carrier 130 is attached to a rearward portion of the frame body 111. A rear carrier unit 133 that includes the microcomputer 12 is attached to the rear carrier 130. The rechargeable battery 134 detachably mounted on the rear carrier unit 133. The rechargeable battery 134 serves as a power source for the gear shift motor 122, the drive assistance motor 142 (explained later), and the microcomputer 12. The rechargeable battery 134 is a storage battery that uses, for example, a nickel chloride cell or a lithium ion cell. The tail lamp 139 is attached to the rechargeable battery 134 so as to form an integral unit.

The assistance motor unit 140 serves to apply an assistance drive force to the front wheel 106 and is attached to a center portion of the front wheel 106. The front brake device is connected to the assistance motor unit 140. If a front brake device is not connected to the assistance motor unit 140, then a brake device can be provided on the front fork 112. As shown in FIG. 3, a drive assistance motor 142, a motor deriver 141, and the bicycle speed sensor 143 are provided inside the assistance motor unit 140. The drive assistance motor 142 is, for example, a three-phase brushless DC motor or an AC motor. The motor driver 141 converts a direct current outputted from the rechargeable battery 134 into an alternating current suitable for driving the drive assistance motor 142. The bicycle speed sensor 143 detects a rotational speed of the drive assistance motor 142, i.e., a speed of the bicycle 101.

The assistance motor unit 140 generates a supplementary torque corresponding to a rider's pedaling force (e.g., a torque equal to the product of a prescribed value and a torque acting on the crank axle 116a) utilizing the drive assistance motor 142. The torque is transmitted from the drive assistance motor 142 to the front wheel 106. The torque acting on the crank axle 1116*a* (depression force of rider pedaling the pedals 119) is detected with a pedaling force sensor 95.

The pedaling force sensor 95 is attached to the hanger section 122 of the frame 102. The pedaling force sensor 95 detects the torque of the crank axle 112*a* in a non-contact manner or by contacting the crank axle 116*a* or the crank arm 116*b*. The pedaling force sensor 95 is, for example, a magnetorestrictive sensor having a magnetorestrictive element provided on the crank axle 116*a* and a detection coil arranged facing opposite the magnetorestrictive element, a strain gauge provided on the crank axle 116*a* or one of the crank arms 116*b*, or a strain gauge provided on a supporting section supporting the crank axle 116*a*. The pedaling force sensor 95 is not limited to these configurations and any sensor whose output varies according to the torque acting on the crank axle 116*a* is acceptable. The pedaling force sensor 95 sends a signal that changes according to the pedaling force acting on the crank axle 116*a* to the microcomputer 12 as information indicating a torque value.

The microcomputer 12 constituting the bicycle control apparatus is arranged inside the rear carrier unit 133 as explained previously and controls electrical components that are electrically connected to the microcomputer 12. The microcomputer 12 includes a CPU (central processing unit), a RAM (random access memory), a ROM (read only memory), and an I/O interface, as well as several functional sections. As shown in FIG. 3, the functional sections of the microcomputer 12 include an assistance output control section 13 that controls the output of the drive assistance motor 142 and a gear shift control section 14 that controls the gear shift motor 122 of the internally geared hub 120.

The microcomputer 12 receives information from sensors and commands resulting from operations performed by a person. More specifically, the microcomputer 12 is electrically connected to the first shifter operating button 91, the second shifter operating button 92, the operating dial 93, the bicycle speed sensor 143, and the pedaling force sensor 95.

The assistance output control section 13 of the microcomputer 112 controls the drive assistance motor 142 such that the drive assistance motor 142 generates an assistance force equal to the product of the rider's pedaling force and a prescribed value. The assistance output control section 13 controls the drive assistance motor 142 according to a plurality of assist modes. More specifically, the assistance output control section 13 has three assist modes, namely a high assist mode that assists with an assist force up to a maximum of 2 times the pedaling force, a medium assist mode that assists with an assist force up to a maximum of 1.5 times the pedaling force, and a low assist mode that assists with an assist force up to a maximum of 1 times the pedaling force. The assistance output control section 13 also has an off mode in which it does not provide assistance. It is acceptable for the assist modes to be changed using a switch (not shown) provided on the handlebar unit 104 or using the operating dial 93.

The gear shift control section 14 of the microcomputer 12 serves to control the gear shift motor 122 so as to change the internally geared hub 121 to another gear. The gear shift control section 14 either controls the gear shift motor 122 in accordance with a shift command issued in response to an operation of the first or second shifter operating button 91 or 92 or controls the gear shift motor 122 in accordance with a shift command generated automatically based on the bicycle speed. As will be explained later with reference to FIG. 4, before changing the gear of the internally geared hub 121, the gear shift control section 14 sends a manual or an automatic shift command to the assistance output control section 13. When the assistance output control section 13 recognizes that the manual or automatic shift request has occurred, it temporarily increases the assistance force produced by the drive assistance motor 142. This will be explained in more detail later.

If a user has selected the manual shifting mode by setting the operating dial 93 to the stop position M, then the gear shift control section 14 will execute a gear change from a lower gear to a higher gear when the first shifter operating button 91 is operated and execute a gear change from a higher gear to a lower gear when the second shifter operating button 92 is operated. That is, the gear shift control section 14 recognizes that a shift command has been issued when the first or second shifter operating button 91 or 92 is pressed.

If a user has selected the automatic shifting mode by setting the operating dial 93 to the stop position A, then the gear shift control section 14 generates a shift command when it determines that changing gears is necessary based on bicycle speed information obtained from the bicycle speed signal from the bicycle speed sensor 143. In step S5 of FIG. 4 (explained later), the gear shift control section 14 sends the shift command to the motor driver 123 serving to drive the gear shift motor 122 of the internal transmission 120. The gear shift control section 14 holds two tables for automatic gear changing and selects which table to use based on a pedaling force value (torque of crank axle 116*a*) detected by the pedaling force sensor 95. More specifically, a table for a high torque mode and a table for a normal mode are stored and both tables store bicycle speed threshold values for upshifting and downshifting in the automatic shifting mode. The bicycle speed threshold values stored for the high torque mode are bicycle speed threshold values for when the pedaling force value is equal to or larger than a prescribed value, and the bicycle speed threshold values stored for the normal mode are bicycle speed threshold values for when the pedaling force value is smaller than a prescribed value.

Figure 4:
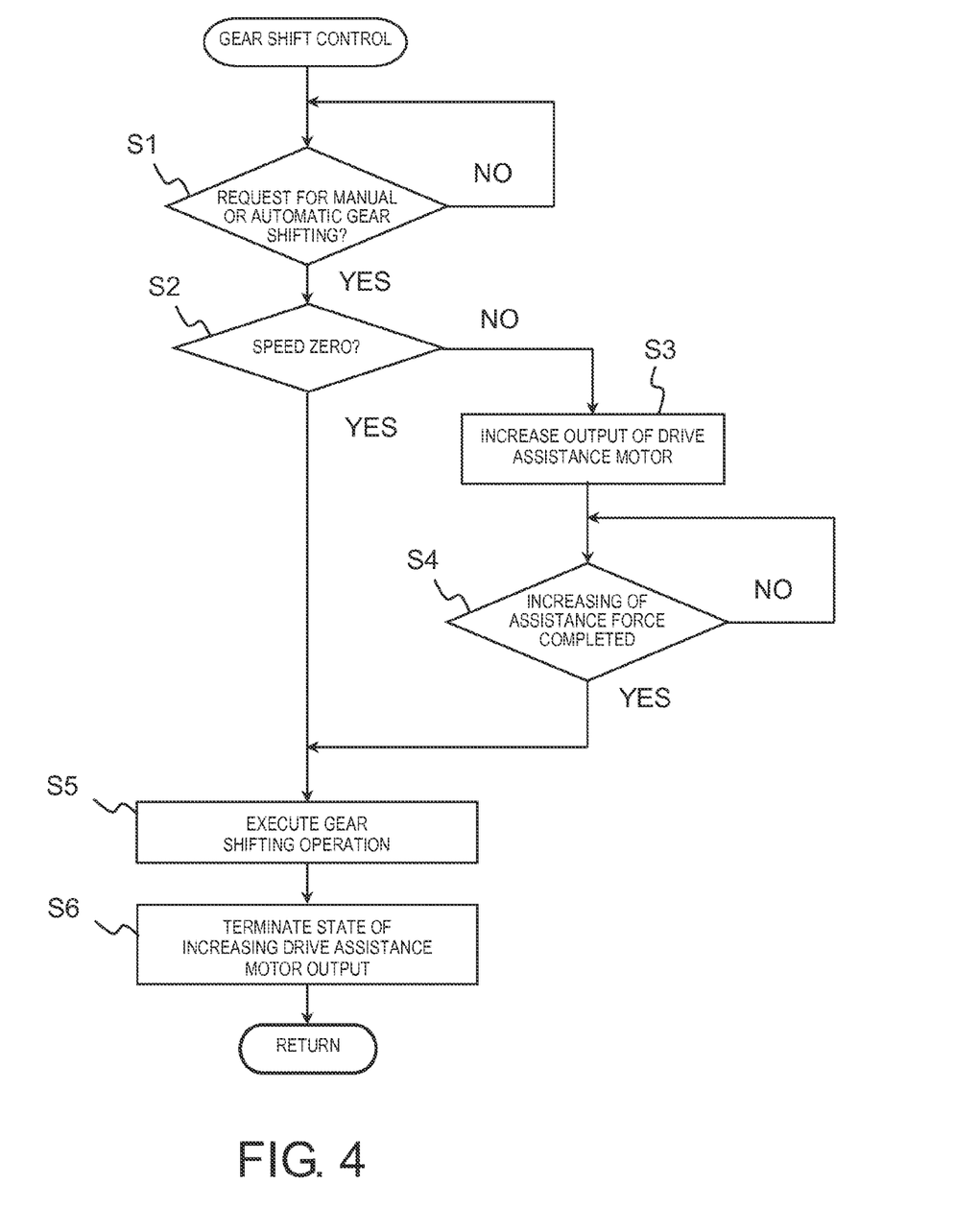
FIG. 4 is a flowchart of a shift control.

The main features of the gear change control executed by the gear shift control section 14 will now be explained with reference to FIG. 4. The gear change control proceeds according to the flowchart shown in FIG. 4 regardless of whether the apparatus is in the manual shifting mode or the automatic shifting mode.

When there is a request to change the gear of the internally geared hub 121, i.e., when a shift command has been issued, the gear shift control section 14 proceeds from step S1 to step S2. In step S2, the gear shift control section 14 determines if the bicycle speed calculated based on the signal from the bicycle speed sensor 143 is zero. If the bicycle speed is zero, then the gear shift control section proceeds from step S2 to step S5 and immediately sends an operating instruction to the gear shift motor 122 to execute a gear change operation. When the bicycle speed is zero, there is substantially no torque acting on the internal parts of the internally geared hub 121 and, thus, the gear change operation is accomplished smoothly. If it determines in step S2 that the bicycle speed is not zero, then the gear shift control section 14 proceeds to step S3. In step S3, the assistance output control section 13 sends a signal to the motor driver 141 and increases the assistance force produced by the drive assistance motor 142 regardless of which assist mode the apparatus is in. The gear shift control section 14 then proceeds to step S4 where it determines if the assistance force produced by the drive assistance motor 142 has actually increased. In step S4, it can be determined that the assistance force has actually increased when, for example, a prescribed amount of time has elapsed since the assistance output control section 13 sent the signal for increasing the assistance force of the drive assistance motor 142 to the motor driver 141. It is also acceptable to determine that the assistance force has actually increased in step S4 when the transmission of the signal for increasing the assistance force is finished. When it determines in step S4 that the assistance force has increased, the gear shift control section 14 proceeds to step S5 and sends a signal to the motor driver 123 to drive the gear shift motor 122 and execute a gear change operation of the internally geared hub 121. At the point in time when this gear change operation starts, the assistance force delivered by the drive assistance motor 142 has already actually increased and, conversely, the pedaling force of the rider depressing the pedal 119 has decreased. Consequently, the torque acting on the internal parts of the internally geared hub 121 due to the rider's pedaling force is smaller during the gear change operation than before the shift command was issued and a smooth gear change operation can be accomplished. When the gear change operation of step S5 is completed, the gear shift control section 14 proceeds to step S6. In step S6, the gear shift control section 14 cancels the increased state of the assistance force produced by the drive assistance motor 142, which was increased in step S3. That is, in step S6, the assistance force of the drive assistance motor 142 is returned from the temporarily increased state of step S3 to a normal size based on the selected assist mode Additionally, it is acceptable to configure step S6 such that the lowered output state of the drive assistance motor 142 is cancelled when a prescribed amount of time has elapsed since the gear change operation was executed in step S5. It is also acceptable to provide a sensor in the transmission or the gear changing motor to detect the current gear and configure step S6 such that the lowered output state of the drive assistance motor 142 is cancelled when it is determined that the gear change operation has been completed based on the output of the sensor.

Although an embodiment of a bicycle control apparatus according to the present invention has been presented heretofore, the present invention is not limited to the embodiment and various modifications can be made without departing from the scope of the invention as defined by the claims.

In the previously explained embodiment, the present invention is employed in a bicycle 101 in which an internally geared hub 121 of an internal transmission 120 is installed on the rear wheel 107. Instead, it is acceptable for the present invention to be employed in a bicycle having a transmission that is installed on the crank axle and configured to change gears using a planetary gear mechanism.

Figure 5:
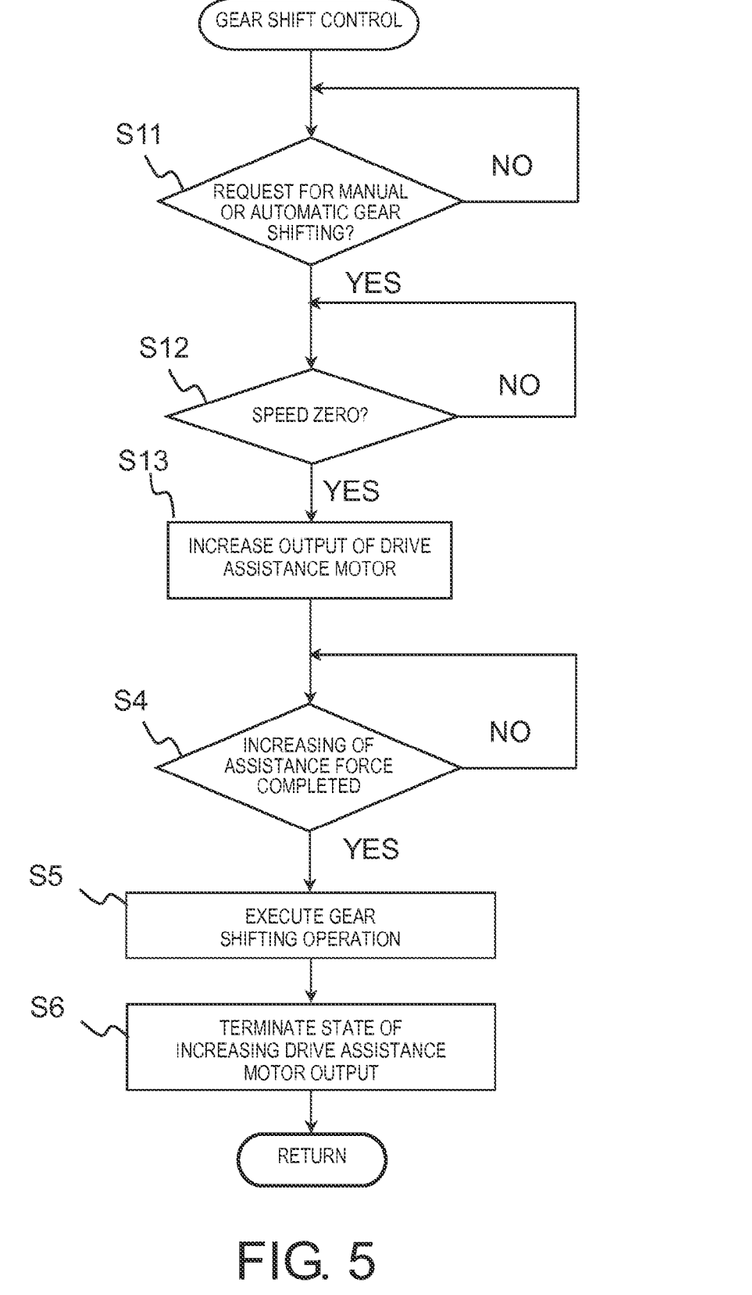
FIG. 5 is a flowchart of a shift control according to another embodiment.

In the previously explained embodiment, the present invention is employed in a bicycle 101 in which an internally geared hub 121 of an internal transmission 120 is installed on the rear wheel 107. Instead, it is acceptable for the invention to be employed in a bicycle equipped with an external transmission having a front derailleur or a rear derailleur that is electrically driven. In such a case, execution of gear change operations can be avoided when an excessive tension exists in the chain and gear change operations can be executed smoothly. In the case of an external transmission, as shown in FIG. 5, in step S12 the gear shift control section 14 determines if the bicycle speed calculated based on the signal from the bicycle speed sensor 143 is zero. If the bicycle speed is zero, then the gear shift control section 14 proceeds to step S13. If the bicycle speed is not zero, then the gear shift control section 14 waits before it proceeds to step S13 and subsequent steps.

In the previously explained embodiment, the assistance motor unit 140 is installed on the front wheel 106. Instead, it is acceptable to install an assistance motor unit on the rear wheel as in the bicycle disclosed in Japanese Laid-Open Patent Application Publication No. 9-58569. The assistance motor unit is provided on the output side of the transmission.

In the previously explained embodiment, the assistance output control section 13 controls the drive assistance motor 142 based on the output of the pedaling force sensor 95, which detects the torque acting on the crank axle. Instead of the pedaling force sensor 95, it is acceptable to provide a sensor that detects a depression force of a pedal or a sensor that detects the tension of the chain. The assistance output control section 13 could then control the drive assistance motor 142 based on the information from such a sensor.

Although in the previously explained embodiment step S2 is configured to determine if the bicycle speed is zero, it is acceptable to configure step S2 to determine if the crank is rotating or not. For example, a crank position sensor can be used as a sensor to detect rotation of the crank. When the crank position detected by the crank position sensor does not change, the gear shift control section determines that the crank is not rotating. If it determines in step S2 that a signal from the crank position sensor changes within a prescribed amount of time, then the gear shift control section determines that the crank is rotating and proceeds to step S3. If it determines in step S2 that the signal from the crank position sensor does not change within the prescribed amount of time, then the gear shift control section determines that the crank is not rotating and proceeds to step S5. The sensor for detecting the rotation of the crank is not limited to the previously explained configuration; it is acceptable for the sensor to be realized with a magnet and a reed switch. In the case of an external transmission, the gear shift control section determines that the crank is rotating in step S12 of FIG. 5 and proceeds to step S13 if the signal from the crank position sensor changes within a prescribed amount of time. If it determines in step S12 that the crank is not rotating, then the gear shift control section waits until it determines that the crank is rotating before it proceed to step S13 and subsequent steps.

Although in the previously explained embodiment step S2 is configured to determine if the bicycle speed is zero, it is acceptable to configure step S2 to determine if a pedaling force is detected by a pedaling force sensor. If it determines in step S2 that a pedaling force exists based on a signal from the pedaling force sensor, then the gear shift control section proceeds to step S3. If not, then the gear shift control section proceeds to step S5. In the case of an external transmission, if it determines in step S12 of FIG. 5 that a pedaling force exists based on a signal from the pedaling force sensor, then the gear shift control section proceeds to step S13. If not, then the gear shift control section waits until a pedaling force is detected before it proceeds to step S13 and subsequent steps.

In the previously explained embodiments, it is acceptable to omit step S2 or S12 and configure the control such that the gear shift control section proceeds to step S3 or S13 when a gear change request is determined to have occurred in step S1.

Although in the previously explained embodiments a gear changing motor is used to change gears, the present invention is not limited to bicycles using a gear changing motor and can be applied a bicycle in which a shifter and a transmission are connected mechanically with a wire (cable) and the transmission is operated with the wire by moving the shifter. In such a case, a sensor for detecting an operation of the shifter or the wire is provided and the sensor outputs a gear shift request when it detects an operation of the shifter or the wire. For example, the sensor is preferably provided on the shifter and configured to output a gear shift request before the wire actually moves when a rider operates an operating part of the shifter.

In steps S2 and S12 the previously explained embodiments, it is acceptable for the gear shift control section to determine if the bicycle speed is within a prescribed range (i.e., equal to or smaller than a prescribed speed that is larger than zero) in addition to determining if the bicycle speed is zero. In such a case, if it determines the bicycle speed is in the prescribed range, then the gear shift control section proceeds to step S3 or S13. If it determines that the bicycle speed is not in the prescribed range, then the gear shift control section waits until the bicycle speed is in the prescribed range before proceeding to step S3 or S13 and subsequent steps. With this configuration, the assistance force can be prevented from increasing further in a high speed region. Instead of or in addition to determining if the vehicle speed is in a prescribed range, it is acceptable for the gear shift control section to determine if a ratio of the motor output with respect to the pedaling force will be within a prescribed range when the assistance force is increased. The ratio of the motor output to the pedaling force is a so-called assistance ratio. In such a case, if it determines the assistance ratio will be in the prescribed range, then the gear shift control section proceeds to step S3 or S13. If it determines that the assistance ratio will not in the prescribed range, then the gear shift control section either waits until the bicycle speed is in the prescribed range before proceeding to step S3 or S13 and subsequent steps or executes the gear change operation without increasing the output of the drive assistance motor.

Moreover, components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle drive apparatus comprising:
    a bicycle transmission;
    a drive assistance electric motor;
    a gear shift motor; and
    a microcomputer including
        an output control section that controls an output of the drive assistance electric motor, and that issues a motor output increasing command that increases the output of the drive assistance electric motor upon receiving a shift command for shifting the transmission, and
        a gear shift control section that operates the gear shift motor of the transmission to perform a gear change operation after the output control section has increased the output of the drive assistance electric motor.

2. The bicycle drive apparatus as recited in claim 1, wherein
    the output control section places the output of the drive assistance electric motor into an increased output state before the gear change operation starts in the transmission.

3. The bicycle drive apparatus as recited in claim 1, further comprising
    a gear shifter unit operatively coupled to the microcomputer; and
    the gear shift control section issues the shift command either in response to manual operation of the gear shifter unit or in response to an automatic shift signal.

4. The bicycle drive apparatus as recited in claim 1, wherein the transmission is an internal transmission.

5. The bicycle drive apparatus as recited in claim 1, wherein the transmission is an external transmission.

6. The bicycle drive apparatus as recited in claim 1, wherein the drive assistance electric motor is a part of a bicycle wheel.

7. The bicycle drive apparatus as recited in claim 3, wherein
    the gear shift control section issues the shift command in response to the manual operation of the gear shifter unit.

8. The bicycle drive apparatus as recited in claim 3, wherein
    the gear shift control section issues the shift command in response to the automatic shift signal.

9. The bicycle drive apparatus as recited in claim 3, wherein
    the gear shifter unit includes a manually operable switching part that is configured to be operated to select between an automatic shifting mode and a manual shifting mode.

10. The bicycle drive apparatus as recited in claim 9, further comprising
    a bicycle speed sensor that outputs information indicative of the bicycle speed to the microcomputer, which produces the automatic shift signal based on the information indicative of the bicycle speed.

11. The bicycle drive apparatus as recited in claim 1, wherein
    the gear shift control section determines whether the bicycle is operating at a threshold before issuing the shift command to the output control section.

12. The bicycle drive apparatus as recited in claim 2, wherein
    the gear shift control section terminates the increased output state of the drive assistance electric motor by-the output control section upon executing the gear change operation.

* * * * *